United States Patent [19]

Ishimura et al.

[11] Patent Number: 5,538,579
[45] Date of Patent: Jul. 23, 1996

[54] METHOD OF PROCESSING A PLURALITY OF GLASS PLATES OR THE LIKE INTO A CIRCULAR SHAPE OR A METHOD OF PERFORATING A PLURALITY OF THE SAME MATERIAL

[75] Inventors: Kazuhiko Ishimura; Yoichi Ozawa; Ikuo Nagasawa; Masabumi Ito, all of Yokohama, Japan

[73] Assignee: Asahi Glass Company Ltd., Tokyo, Japan

[21] Appl. No.: 132,968

[22] Filed: Oct. 7, 1993

[30] Foreign Application Priority Data

Oct. 8, 1992 [JP] Japan .................... 4-270291
Oct. 8, 1992 [JP] Japan .................... 4-270292

[51] Int. Cl.[6] .................................... B32B 31/18
[52] U.S. Cl. .................... 156/250; 156/275.5; 156/101; 156/155; 156/344; 408/204; 118/401; 118/423; 118/500; 118/501; 427/169; 427/443.2
[58] Field of Search .................... 409/204, 131, 409/132; 408/204; 156/250, 305, 275.5, 101, 155, 344; 118/501, 423, 401, 500; 427/169, 443.2

[56] References Cited

U.S. PATENT DOCUMENTS

| | | | |
|---|---|---|---|
| 1,219,461 | 3/1917 | Johnston | 408/204 X |
| 1,385,732 | 7/1921 | Taylor | 408/204 X |
| 1,825,277 | 9/1931 | Lytle | 408/204 X |
| 2,016,159 | 10/1935 | Warmoth | 118/501 X |
| 2,638,084 | 5/1953 | McLaughlin | 408/204 X |
| 2,906,256 | 9/1959 | Glynn | 408/204 X |
| 3,333,278 | 7/1967 | Hawkins et al. | 156/155 |
| 3,749,625 | 7/1973 | Berg | 156/250 |
| 4,129,093 | 12/1978 | Johnson | 118/401 |
| 4,167,500 | 9/1979 | Jazenski et al. | |
| 5,009,731 | 4/1991 | Yoshikawa et al. | |

FOREIGN PATENT DOCUMENTS

| | | | |
|---|---|---|---|
| 2318935 | 10/1974 | Germany | 156/250 |
| 2001773 | 1/1987 | Japan | 156/344 |
| 62-107909 | 5/1987 | Japan | 408/204 |
| 0171238 | 7/1989 | Japan | 156/344 |
| 816759 | 4/1981 | U.S.S.R. | 408/204 |
| 0954499 | 8/1982 | U.S.S.R. | 118/401 |
| 827907 | 2/1960 | United Kingdom | 156/305 |

Primary Examiner—David A. Simmons
Assistant Examiner—Steven J. Helmer
Attorney, Agent, or Firm—Oblon, Spivak, McClelland, Maier & Neustadt

[57] ABSTRACT

A plurality of glass plates 10 are stacked in a block form without forming gaps between adjacent glass plates while the stacked glass plates are separable; the stacked glass plates are cut off in a circular shape or a doughnut-like shape in a block; and then, the processed glass plates are separated. According to this method, tipping which may result when glass plates are processed individually can be prevented whereby processing is easy, and productivity is improved.

24 Claims, 8 Drawing Sheets

METHOD OF PROCESSING A PLURALITY OF GLASS PLATES OR THE LIKE INTO A CIRCULAR SHAPE OR A METHOD OF PERFORATING A PLURALITY OF THE SAME MATERIAL

BACKGROUND OF THE INVENTION

1. Field of the Invention

The present invention relates to a method of cutting or perforating a plurality of plate-like materials such as glass, ceramics or another fragile materials to have exactly the same circular shape or an opening having exactly the same dimension.

2. Discussion of Background

Generally, a disk-like glass plate used for an optical disk, a magnetic disk, an optical-magnetoelectric disk or the like has been processed by annularly arranged grindstones. Namely, when a disk-like glass plate is to be obtained, an individual rectangular glass plate was fixed onto a processing table by means of vacuum suction; the annularly arranged grindstones are rotated to thereby cut off a disk-like glass plate from the rectangular glass plate. Namely, the disk-like glass plate was obtained by processing the outer periphery of the rectangular glass plate into a circular shape and/or perforating the inner portion of the disk-like glass plate simultaneously or separately. Recently, the optical disk, the magnetic disk or the like has been miniaturized, and the outer diameter and the wall thickness of the optical disk, the magnetic disk or the like has become thinner.

However, when the outer diameter of the optical disk or the magnetic disk is made smaller to be, for instance, less than 2.5 inches and the thickness of the same is less than 0.05 inches, it is difficult to fix by vacuum suction a rectangular glass plate on a processing table, and accordingly, it is difficult to process the glass plate to be circular or to perforate it. Further, another problem is that since the rectangular glass plate has to be processed one by one to obtain the disk-like glass plate, productivity can not be improved to thereby invite a manufacturing cost increase.

Further, as shown in FIG. 10, when disk-like glass plates 2 are processed individually to have a circular shape or perforation, there easily causes tipping (i.e. breakage of an edge portion) at an inner edge portion 2A or an outer edge portion of the disk-like glass, thereby resulting poor yield.

SUMMARY OF THE INVENTION

It is an object of the present invention to provide a method of processing a plurality of glass plates or other fragile materials to have a circular shape or a perforated portion easily as well as providing remarkable improve of productivity and good yield.

In accordance with the present invention, there is provided a method of processing a plurality of plate-like materials to have a circular shape or a perforated portion which comprises stacking a plurality of plate-like materials into a block form without forming gaps between adjacent materials while the materials being separable, and cutting off a plurality of circular plates with or without perforated portion, or cutting off a plurality of doughnut-like plates in a block form.

Further, in accordance with the present invention, there is provided a method of processing a plurality of plate-like materials into a circular shape which comprises stacking a plurality of plate-like materials into a block form wherein a bonding layer is formed between adjacent plate-like materials without forming gaps while the plate-like materials being separable.

Further, in accordance with the present invention, there is provided a method of processing a plurality of circular or doughnut-like circular plate materials with use of a grindstone for cutting off circular glass plates or doughnut-like glass plates which comprises:

a step of rotating a cylindrical grindstone, a step of feeding a Grinding liquid to the outer periphery or the inner periphery of the cylindrical grindstone, a step of introducing the grinding liquid fed to the outer periphery or the inner periphery of the cylindrical grindstone downwardly to the grinding portion of the grinding stone by means of a spiral groove which is formed in either periphery of the grindstone in the opposite direction with respect to the direction of the rotation of the cylindrical grindstone, a step of introducing the grinding liquid and cuttings at the grinding portion upwardly by means of a spiral groove which is formed at the other periphery of the cylindrical grindstone in the same direction as the direction of the rotation of the cylindrical grindstone, and discharging the grinding liquid and the cuttings outwardly.

In accordance with the present invention, a plurality of plate-like materials stacked in a block form while the materials being separable can be processed at once. Then the processed plate-like materials can be separated individually. Further, tipping, which may be caused when plate-like materials are individually processed, can be eliminated.

Further, since a bonding layer is formed between the adjacent plate-like materials stacked in a block form so as not to produce gaps between the adjacent materials, the optimum condition of the stacked plate-like materials without gaps is obtainable. After processing, the plurality of plate-like materials in a block form can be separated.

When disk-like glass plates are processed with use of a grindstone, it is necessary to feed a grinding liquid to a portion of the glass plate to be ground because heat is produced in the ground portion. The heated portion has to be cooled and cuttings produced by grinding have to be removed. However, when a number of glass plates are stacked in a block form, the thickness is increased, whereby there causes a problem that the grinding liquid can not sufficiently be supplied to the ground portion of the glass plates located at a lower position.

According to the present invention, a cylindrical grinding stone is used to process a plurality of glass plates stacked closely in a block form into a circular shape wherein a spiral groove of a forward direction of thread or a reverse direction of thread is formed at the outer periphery of the cylindrical grindstone and another spiral groove is formed at the inner periphery, the another spiral groove having the direction of thread opposite that formed at the outer periphery so that a grinding liquid can be sufficiently supplied to the portion to be ground of the glass plates and removed therefrom. Accordingly, the grinding liquid fed to the outer periphery or the inner periphery of the cylindrical grindstone can be introduced to the lower portion of the grindstone by means of the spiral groove which downwardly introduces the grinding liquid. Further, the grinding liquid and cuttings at the lower portion of the grindstone can be introduced upwardly by means of the spiral groove formed in the other outer periphery of the grindstone, and discharged outside.

BRIEF DESCRIPTION OF DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF PREFERRED EMBODIMENTS

Figure 1:
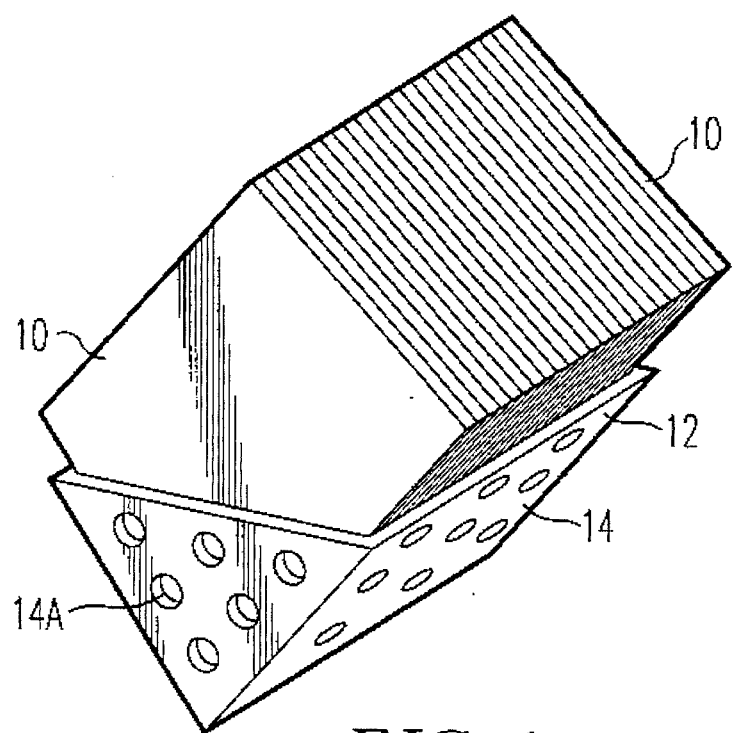
FIG. 1 is a diagram showing how a plurality of plate-like materials are stacked according to the present invention.

Preferred embodiments of the method of processing a plurality of plate-like materials according to the present invention will be described with reference to the drawings. In the drawings, the same reference numerals designate the same or corresponding parts.

FIG. 1 is a perspective view showing that a plurality of stacked glass plates 10, 10 ... are placed on a receiving tray 12. Each of the glass plates 10 are made of a fragile material and is formed to be a rectangular thin plate. For instance, 50 or 100 glass plates are set up in a stacking state on the receiving tray 12.

Figure 2:
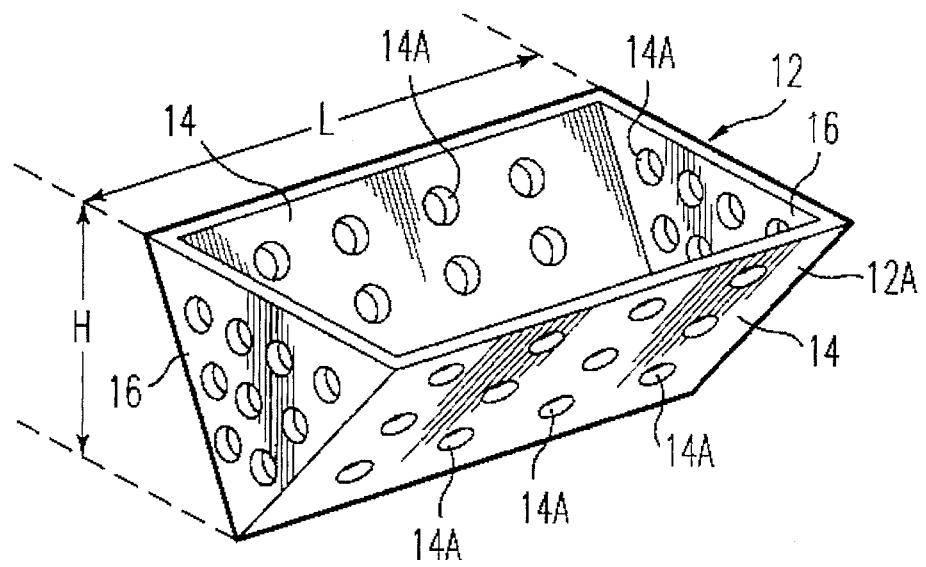
FIG. 2 is a perspective view of an embodiment of a receiving tray used for the method of stacking a plurality of plate-like materials in the present invention.

As shown in FIG. 2, the receiving tray 12 is constituted by a substantially V-like plate 14 with a number of openings 14A, and a pair of side plates 16 for closing both ends of the plate 14. The plates 16 are of a triangular shape and are provided with a number of openings 14A in the same manner as the plate 14.

Figure 3:
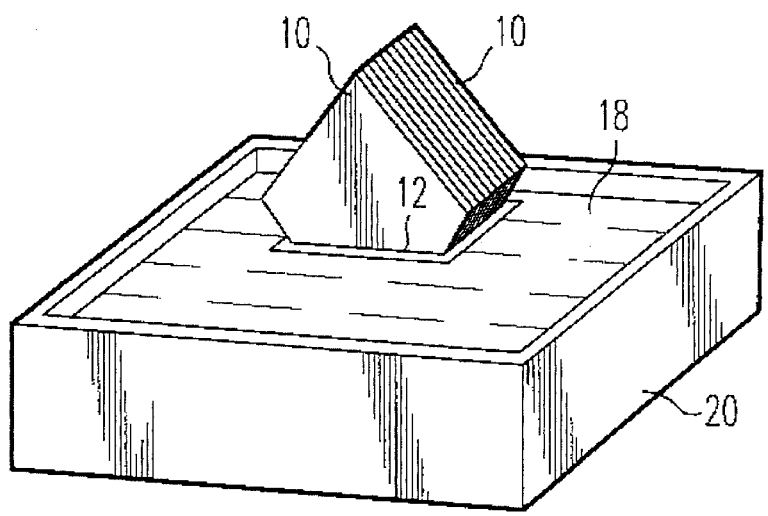
FIG. 3 is a diagram showing how a plurality of plate-like materials are stacked in a block form.

The dimensions of the length and the height of the receiving tray 12 are respectively determined so that the stacked glass plates 10, 10 ... can be set up in the receiving tray 12 in a stable manner. The receiving tray 12 in which the glass plates 10, 10 ... are set up is dipped in a bonding liquid 18 (FIG. 3) which is filled in a bucket 20.

When the receiving tray 12 is dipped in the bonding liquid 18, the bonding liquid 18 enters into the receiving tray 12 through the openings 14A, 14A .... The bonding liquid 18 invades into air gaps between adjacent glass plates 10, 10 in a stacked state, and the bonding liquid 18 spreads throughout the entire air gap regions between the adjacent glass plates 10, 10 due to capillarity. Thus, the bonding liquid are coated on the entire surface of the glass plates 10.

In this case, by clamping the stacked glass plates 10, 10 ... with a vice, the thickness of the bonding liquid 18 between the adjacent glass plates 10, 10 can be kept uniform. For the bonding liquid 18, wax or resin curable on irradiation of ultraviolet rays (both commercially available) may be used. Wax is softened to become liquid at a predetermined temperature and is solidified at the room temperature. The resin usable in the present invention is solidified upon irradiating ultraviolet rays. Accordingly, in a case of using the wax, when a plurality of glass plates 10, 10 ... stacked in a block form are dipped in the bonding liquid 18 and then, they are drawn up from the bonding liquid 18 so that they are left in the room temperature. The bonding liquid 18 between the glass plates 10, 10 in the stacked glass plates is solidified.

Figure 4A:
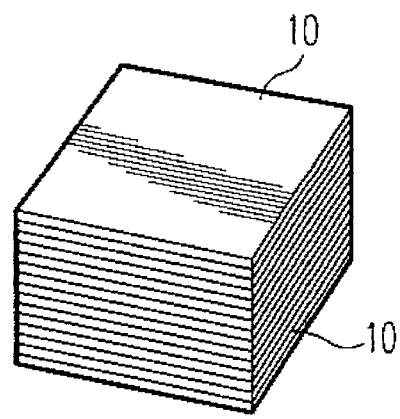
FIG. 4A is a perspective view showing how a plurality of plate-like materials are stacked in accordance with the method of the present invention.
Figure 4B:
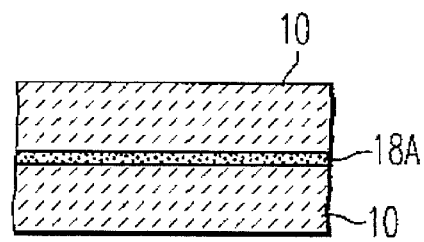
FIG. 4B is an enlarged cross-sectional view of a part of the stacked plate-like material.

In a case of using the resin curable upon the irradiation of ultraviolet rays, the glass plates 10, 10 ... stacked in a block form is dipped in the bonding liquid 18, they are drawn up from the bonding liquid 18 and are subjected to the irradiation of ultraviolet rays, then, the bonding liquid 18 between the glass plates 10, 10 in the stacked glass plates is solidified. Thus, the adjacent glass plates 10, 10 in the stacked glass plates are joined by the solidified bonding liquid 18. In this case, bonding layers 18A are formed between the adjacent glass plates 10, 10 in the stacked glass plates in a block form, the glass plates 10, 10 ... are brought to close-contact with each other in a block form (vide FIGS. 4A and 4B).

Further, the plurality of glass plates 10, 10 ... stacked in a block form with the wax can be separated by dipping the stacked glass plates 10, 10 ... in a releasing liquid.

The plurality of glass plates 10, 10 ... stacked in a block form with the UV-cured resin can be separated by the irradiation of ultraviolet rays. The UV-cured resin may be capable of melting in boiling water.

The plurality of glass plates 10, 10 ... stacked closely in a block form is fixed on the table of a grinding machine by means of an attaching means such as a clamping device, wax vacuum-suction device or freeze chuck. An example of the freeze chuck will be described with reference to FIG. 5. Peltier elements 24, 24 ... are embedded in the table 22 of the grinding machine so that they are cooled or heated by switching a voltage to positive and negative sides. Accordingly, the table 22 and the plurality of glass plates 10, 10 ... stacked closely in a block form can be fixed by freezing water surrounding them, whereby the freeze chuck is effected to the plurality of glass plates 10, 10 ... stacked in a block form and the table 22.

when the Peltier elements 24, 24 ... are heated, the freeze chuck is released, whereby the plurality of glass plates 10, 10 ... stacked closely in a block form can be removed from the table 22.

Figure 5:
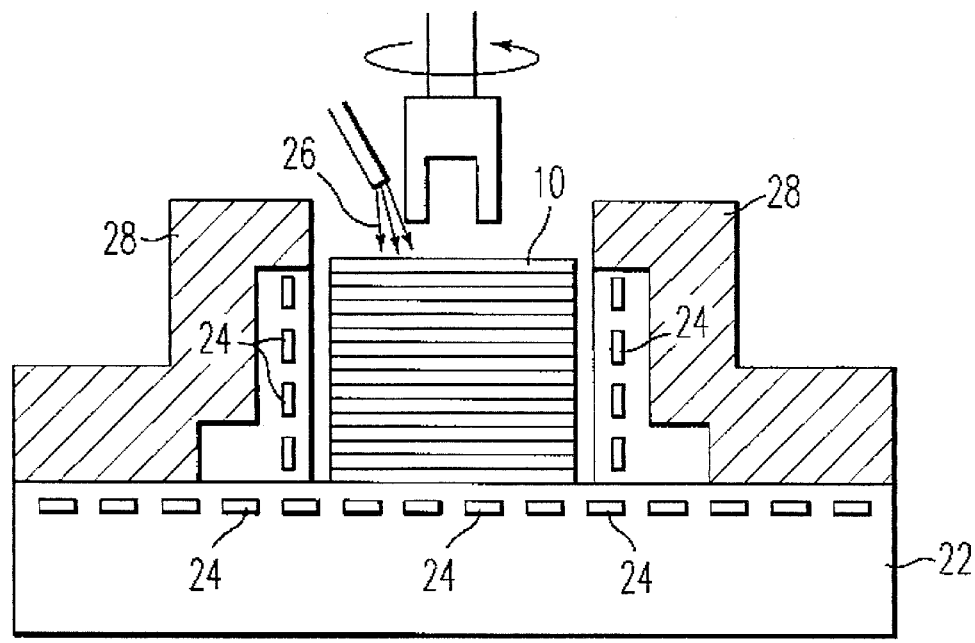
FIG. 5 is a diagram showing a method of processing a plurality of plate-like materials according to the method of the present invention.

In a case of processing the plurality of glass plates 10, 10 ... stacked closely in a block form which are fixed to the table 22 by means of the freeze chuck as shown in FIG. 5, it is necessary to cool a cutting water 26 so that ice or the freeze chuck does not melt. A cooling effect for the Peltier elements 24, 24 . . . can be increased by providing a heat insulating material 28 around the plurality of glass plates 10, 10 . . . stacked closely in a block form. Further, it is further possible to increase the cooling effect by embedding the Peltier elements 24, 24 . . . in the inner periphery of the heat insulating material 28. Thus, the plurality of glass plates 10, 10 . . . sucked closely in a block form can be processed with use of, for instance, a grindstone by fixing the glass plates 10, 10 . . . in a block form on the table 22 by means of the freeze chuck. According to this process, the plurality of glass plates 10, 10 . . . can be simultaneously ground.

Then, the plurality of glass plates 10, 10 . . . stacked in a block form can be separated individually, after the completion of the grinding operation, by dipping the block into the releasing liquid, or by irradiating ultraviolet rays, or by boiling it in a hot water.

As described above, by fixing the plurality of glass plates 10, 10 . . . stacked in a block form on the table 22 by means of the freeze chuck, the plurality of glass plates 10, 10 . . . stacked in a block form can be held on the table 22 with a sufficient holding strength which is durable to a load during the processing even when the outer diameter of the glass plates to be processed is small. Accordingly, it is possible to solve the problem of difficulty in the vacuum-sucking of a plurality of rectangular glass plates in a block form in order to process them onto the processing table when the outer diameter of disk-like glass plates to be cut is small or the thickness of the glass plates is less than 0.05 inches.

Figure 6:
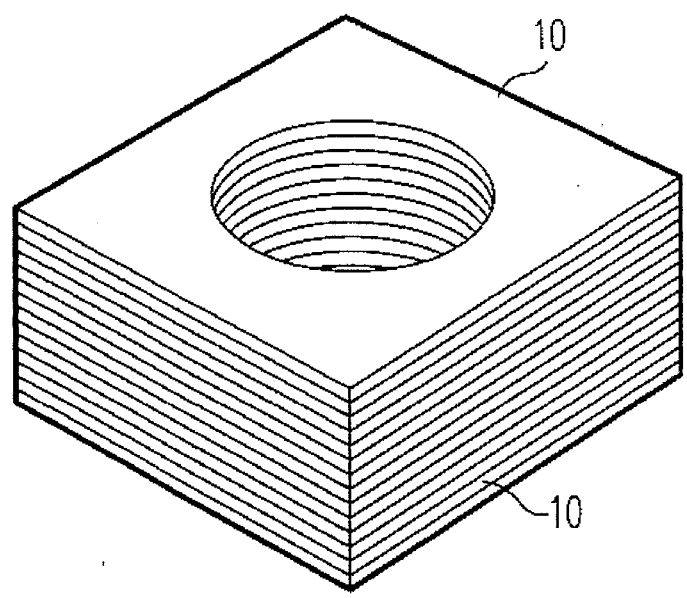
FIG. 6 is a diagram showing a method of processing a plurality of plate-like materials.

FIG. 6 shows a state that a plurality of glass plates 10, 10 . . . stacked closely in a block form are simultaneously perforated.

Figure 7:
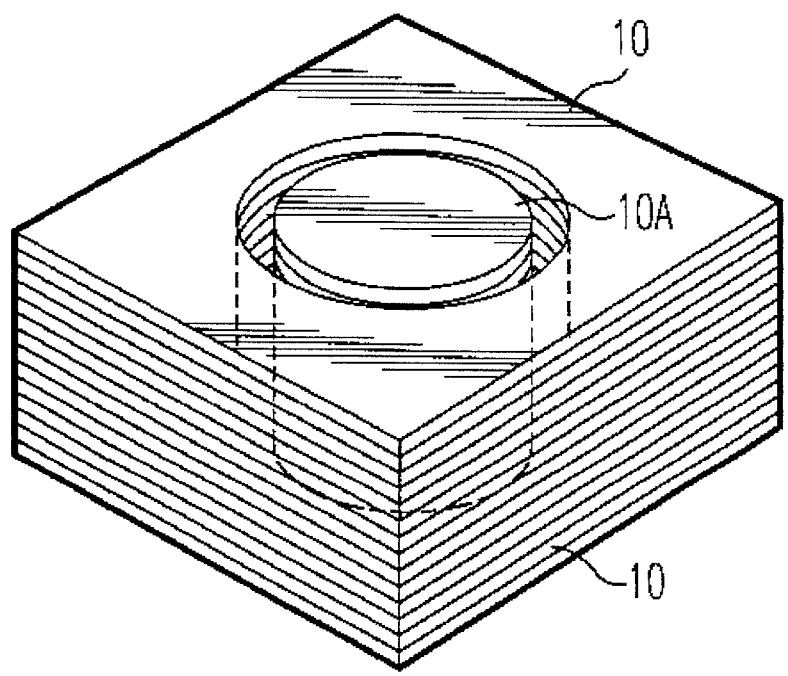
FIG. 7 is a diagram showing a method of processing a plurality of plate-like materials.
Figure 8:
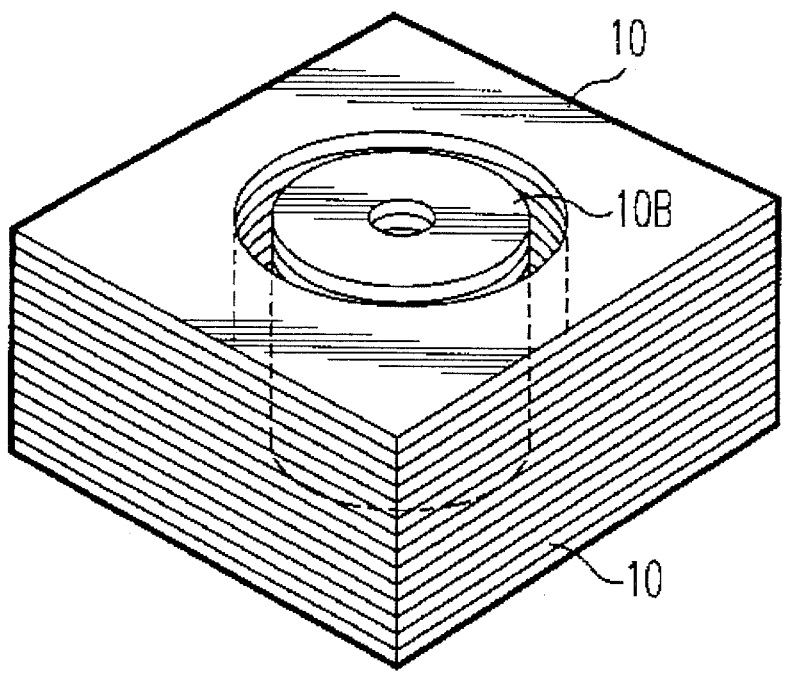
FIG. 8 is a diagram showing a method of processing a plurality of plate-like materials.

FIGS. 7 and 8 show states that circular glass plates 10A, 10A . . . and doughnut-like circular plates 10B, 10B . . . are cut off from a plurality of glass plates 10, 10 . . . stacked closely in a block form.

As shown in FIGS. 6 through 8, the processing of the plurality of the plurality of glass plates 10, 10 . . . stacked closely in a block form can be conducted in the same manner as that a block material is processed, whereby productivity can be improved in comparison with the case that glass plates 10 are processed one by one.

Figure 9:
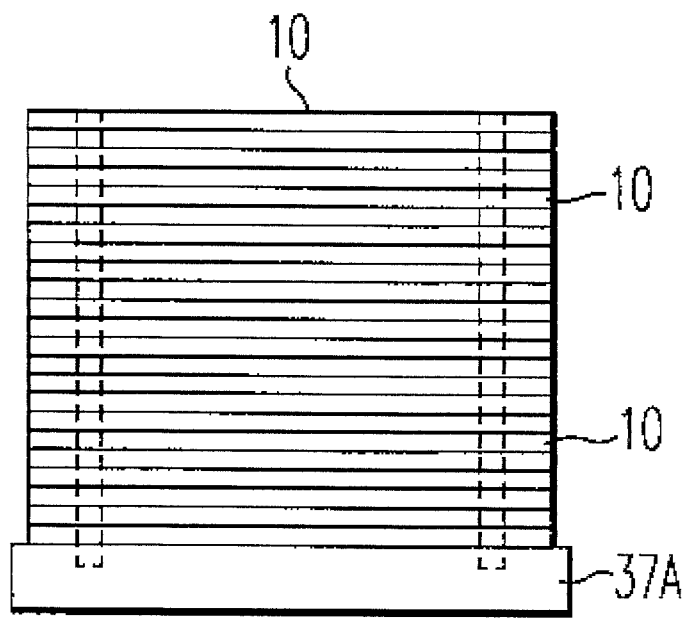
FIG. 9 is a diagram showing a method of processing a plurality of plate-like materials.
Figure 10:
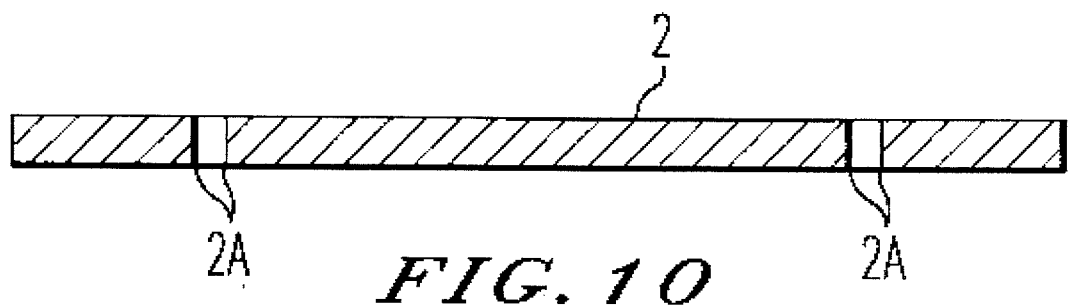
FIG. 10 is a cross-sectional view showing occurrence of tipping in a plate-like material.

When the glass plates are ground one by one, tipping is easily resulted at an edge portion of the glass plates. However, the plurality of glass plates 10, 10 . . . stacked closely in a block form can greatly reduce a danger of occurrence of the tipping during the processing. However, the tipping may result at the glass plate located at the lowermost portion of the plurality of glass plates 10, 10 . . . stacked closely in a block form. In order to eliminate the occurrence of the tipping, a dummy glass plate 37A may be attached to the lower surface of the lowermost glass plate 10 (FIG. 9). In this case, when the circular glass plates 10A, 10A . . . or the doughnut-like circular glass plates 10B, 10B . . . are cut off from the plurality of glass plates 10, 10 . . . stacked closely in a block form, the circular glass plates 10A, 10A . . . or the doughnut-like circular glass plates 10b, 10B . . . can be maintained in a state that they are fixed to the dummy glass plate 37A if the dummy glass plate 36 is processed to a certain extent, but not completely processed. In this case, precise cutting operations are possible. The dummy plate may be attached onto the uppermost glass plate in addition to the lowermost glass plate in order to eliminate the occurrence of the tipping of the uppermost glass plate.

Description has been made as to use of the wax or the UV-cured resin as the bonding material. However, the present invention is not limited to those materials but another bonding material may be used as far as they have the same function and effect as the wax or the UV-cured resin.

In the above-mentioned example, the receiving tray 12 with a number of openings is used. However, another receiving tray having cut portions may be used.

Figure 15:
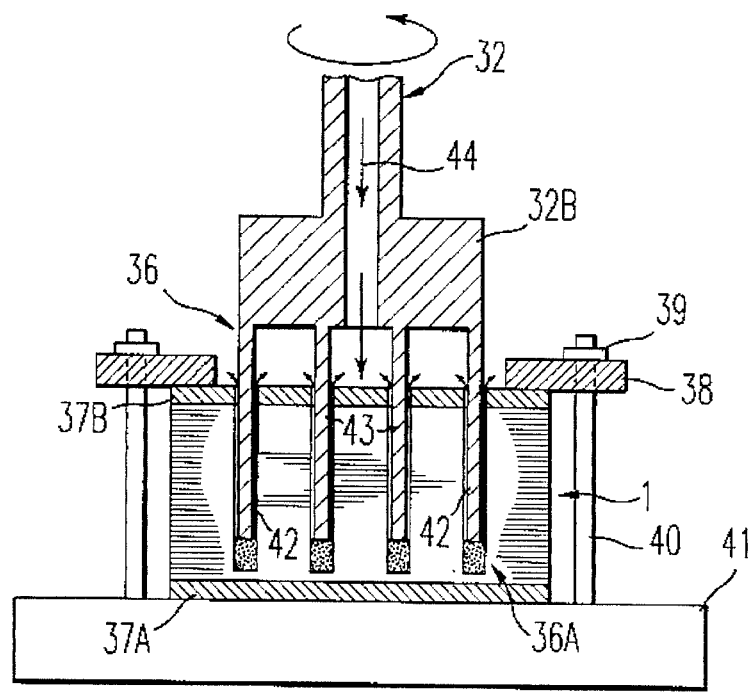
FIGS. 15 and 16 are diagrams showing another method of processing a disk plate-like materials according to the present invention.
Figure 16:
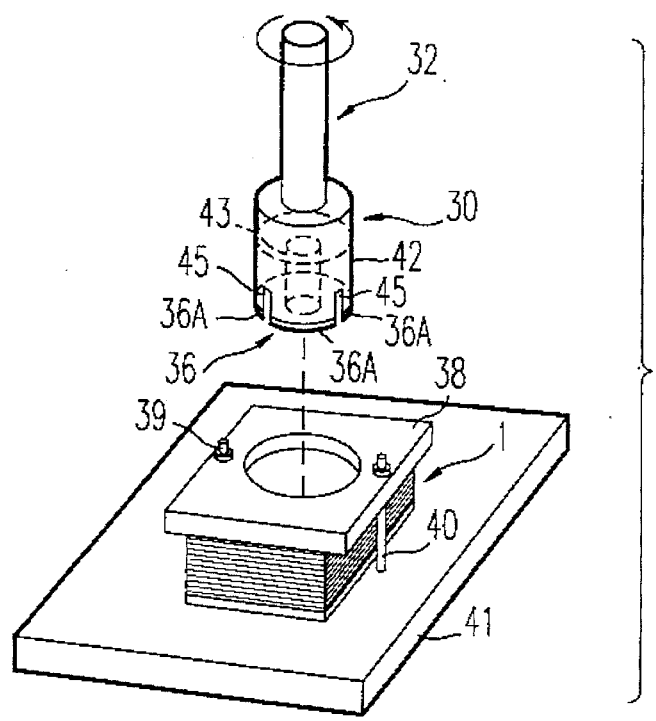

Further, description has been made as to the case that the plurality of glass plates 10, 10 . . . stacked closely in a block form are held in the table of a grinding machine with use of the freeze chuck. However, the plurality of glass plates 10, 10 . . . in a block form may be fixed to the table of a grinding machine with use of a vice, a clamp, a combination of a pressing plate, bolts and nuts or the like. FIGS. 15 and 16 show that a plurality of glass plates 10, 10 . . . are fixed onto a table 41 by using a pressing plate 38 having a central opening which is perforated into a circular shape, bolts 40 and nuts 39.

In the following, a method of processing circular glass plates from a plurality of glass plates stacked closely in a block form wherein a grinding liquid can be sufficiently supplied to a portion to be ground; cutting operation can be made easily and the grinding liquid can be easily discharged, and a grindstone used for the above-mentioned methods will be described.

Figure 11:
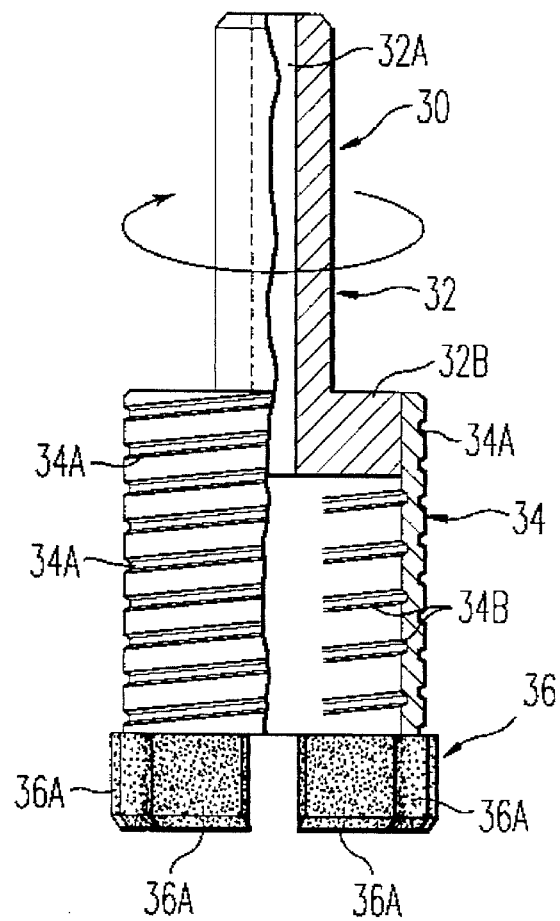
FIG. 11 is a front view partly cross-sectioned of an embodiment of the grindstone used for the present invention.
Figure 12:
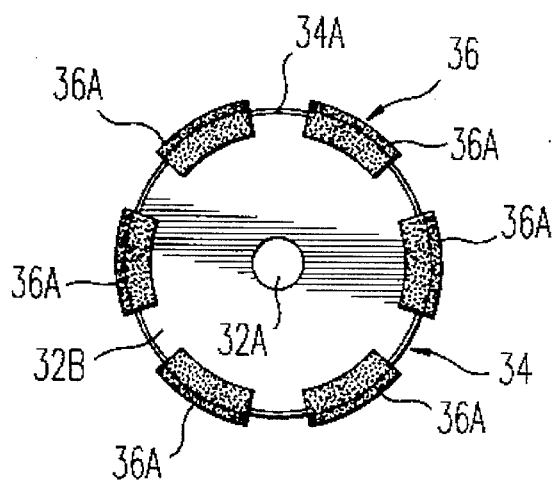
FIG. 12 is a bottom view of the grindstone shown in FIG. 11.

FIG. 11 is a front view partly cross-sectioned of a grindstone (core drill) 30 used for the present invention and FIG. 12 is a bottom view of the grindstone 30.

The grindstone 30 comprises a shaft portion 32, a cylindrical portion 34 and a grindstone portion 36, wherein the shaft portion 32 is detachably attached to the rotating shaft of a grinding machine (not shown). The shaft portion 32 is provided with a hole 32A on the same axial line. The hole 32A is communicated with a grinding liquid supplying source of the grinding machine when the shaft 32 is attached to the rotating shaft of the machine.

A flange 32B is formed at an end of the shaft portion 32, and the flange 32B is firmly attached with the upper end of the cylindrical portion 34 so that the cylindrical portion 34 is on the same axial line of the shaft portion 32. A spiral groove 34A having a forward thread is formed at the outer periphery of the cylindrical portion 34 while a spiral groove 34B having a reverse thread is formed at the inner periphery of the cylindrical portion 34. The forward spiral groove 34A and the reverse spiral groove 34B respectively guide the grinding liquid supplied thereto.

The grindstone portion 36 is fixed to the lower end portion of the cylindrical portion 34. Namely, the grindstone portion 36 comprises segment grindstones 36A, 36A . . . which are arranged in an arc form with a predetermined intervals (FIG. 12). Since gaps are formed between adjacent grindstones 36A, 36A, the grinding liquid guided to the segment grindstones 36A, 36A . . . by means of, for instance, the reverse spiral groove 34B is introduced into the spiral groove 34A of forward thread through the gaps between the segment grindstones 36A, 36A.

An example of the cutting-off of a plurality of disk-like glass plates from a plurality of glass plates stacked closely in a block form by using the grindstone having the construction described above will be described with reference to FIG. 13.

The shaft portion 32 of the grindstone 30 is attached to the rotating shaft of the grinding machine so that the hole 32A of the shaft portion 32 is in communication with the grinding liquid supplying source of the grinding machine. On driving the grinding liquid supplying source, the grinding liquid is introduced to the inner periphery of the cylindrical portion 34 through the hole 32A.

Then, the grindstone 32 is clockwisely rotated so that the plurality of glass plate 10, 10 . . . stacked closely in a block form are ground with the segment grindstones 36A, 36A . . . . When the portion of the stacked glass plates to be ground by the segment grindstones 36A, 36A . . . is shallow, the grinding liquid can be easily fed to that portion.

Figure 13:
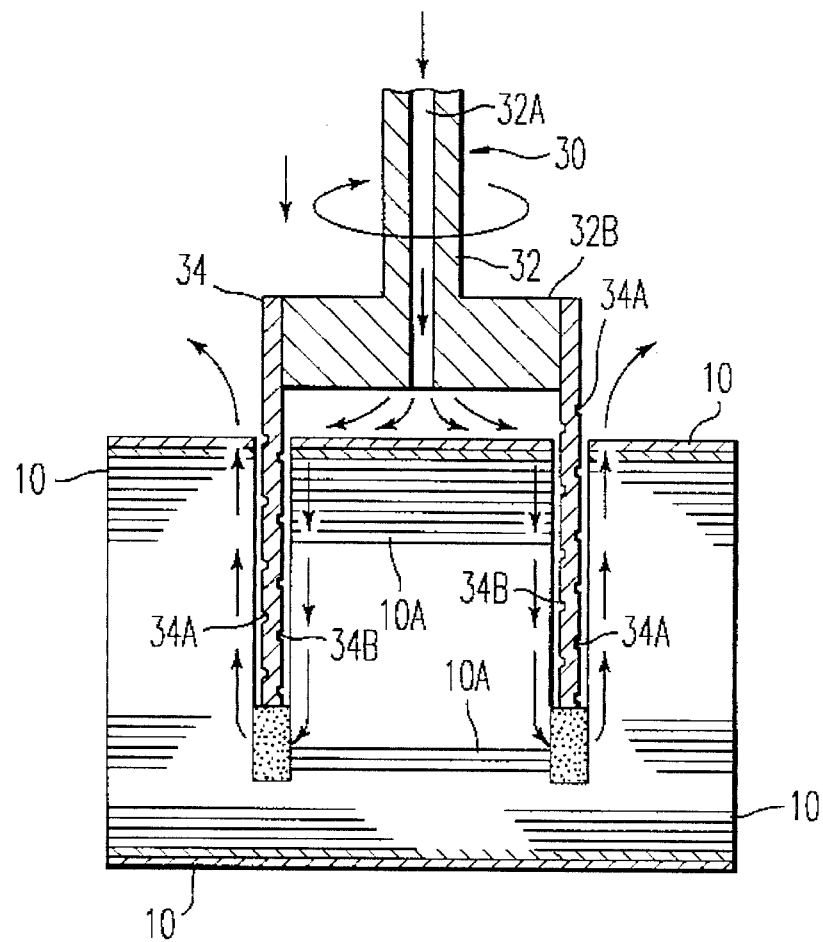
FIG. 13 is a diagram showing a method of processing disk plate-like materials with use of the grindstone of the present invention.
Figure 14:
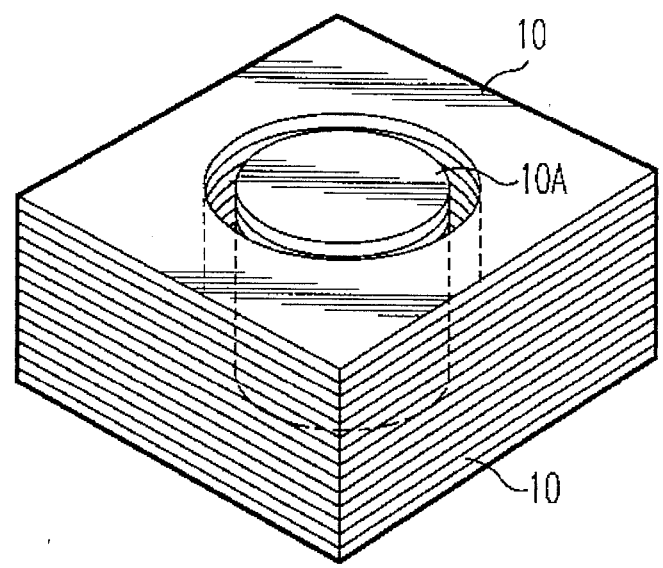
FIG. 14 is a diagram showing a state of disk plate-like materials processed with use of the grindstone of the present invention.

However, on continuing the grinding operation, the portion of the stacked glass plates to be ground with the segment grindstones 36A, 36A . . . becomes deep as shown in FIG. 13. In this case, the grinding liquid supplied to the inner periphery of the cylindrical portion 34 is introduced downwardly along the spiral groove 34B of reverse thread which is formed at the inner periphery of the cylindrical portion 34, and the liquid reaches the grindstone portion 36 consisting of the segment grindstones 36A, 36A . . . . The grinding liquid which has reached the grinding portion 36 is introduced to the outer periphery side of the cylindrical portion 34 through the gaps formed between the segment grindstones 36A, 36A.

Then, the grinding liquid introduced to the outer periphery side of the cylindrical portion 34 is upwardly guided along the spiral groove 34A of forward thread which is formed at the outer periphery of the cylindrical portion 34, and finally, the liquid is discharged from the outer surface of the glass plate 10 at the top of the stacked glass plates 10, 10 . . . .

In the above-mentioned example, the grinding liquid is supplied to the inner periphery of the cylindrical portion 34. However, the grinding liquid may be supplied to the outer periphery of the cylindrical portion.

Further, in the above-mentioned example, the spiral groove of forward thread is formed at the outer periphery of the cylindrical portion 34 while the spiral groove of reverse thread is formed at the inner periphery. However, the spiral groove of reverse thread may be formed at the outer periphery of the cylindrical portion 34 and the spiral groove of forward thread may be formed at the inner periphery.

Further, in the above-mentioned example, the grindstone is rotated clockwisely. However, the grindstone may be rotated counter clockwisely.

In the above-mentioned example, the upper end of the cylindrical portion 34 is firmly attached to the flange 32B so that the cylindrical portion 34 and the shaft portion 32 are formed in one piece. However, the shaft portion 32 and the cylindrical portion 34 may be formed by cutting a one piece material. In this case, accuracy in coincidence of the axial lines of the shaft portion 32 and the cylindrical portion 34 can be improved.

In the above-mentioned example, the disk-like glass plates are processed by grinding the outer periphery of the glass plates with use of a single core structure (i.e. with use of a circular grindstone 36 for processing the outer periphery). However, doughnut-like glass plates can be processed by grinding simultaneously the inner periphery and the outer periphery by using a double core structure. FIGS. 15 and 16 show an embodiment of a grinding machine having the grindstones 36 of such double core structure. Outer grindstones 42 arranged in a circular form for processing the outer periphery and inner grindstones 43 arranged in a circular form for processing the inner periphery are provided on the same axis. The grindstone shown in FIGS. 15 and 16 is of a structure without the spiral grooves 34A, 34B as shown in FIG. 13. Instead of the spiral grooves, slits 45 are formed in the outer and inner grindstones 42, 43 so that the grinding liquid supplied from the axial bore of the shaft portion 32 reaches the extreme ends of the outer and inner grindstone 42, 43, and then, it is discharged outside.

Further, description has been made as to a case that a plurality of disk-like glass plates 10A, 10A . . . are cut off by processing a plurality of glass plates 10, 10 . . . stacked closely in a block form. However, the present invention can be used for grinding another work.

In the above-mentioned example, glass plates having especially a thickness of 0.05 inches are used as materials to be processed. However, crystallized glass plates, ceramic plates, silicon plates or plates of a fragile material may be used.

In accordance with the method of processing a plurality of plate-like material and the method of stacking a plurality of plate-like materials of the present invention, a plurality of plate-like materials are closely stacked into a block form without gaps between adjacent plate-like materials while they are separable; the stacked plate-like materials are processed at once, and then the processed plate-like materials are separated individually. Accordingly, a plurality of late-like material can be simultaneously processed Further, tipping which may result when the plate-like materials are individually processed, can be eliminated.

Further, in accordance with the present invention, bonding layers are formed between the adjacent plate-like materials which are stacked closely in a block form. When required, the plate-like materials stacked closely in a block form can be separated individually. Accordingly, the processing operation is easy and productivity can be improved.

Further, in accordance with the method of processing plate-like materials into a circular shape or forming perforations, a grinding liquid supplied to the outer periphery or the inner periphery of the cylindrical portion of the grindstone is introduced downwardly to the grinding portion by means of a spiral groove formed in one periphery. Further, the grinding liquid introduced to the grinding portion and cuttings can be introduced upwardly by means of a spiral groove formed at the other periphery and they can be discharged outside. Accordingly, the grinding liquid can be sufficiently supplied to the grinding portion when a plurality of disk-like glass plates are processed from a plurality of glass plates stacked closely in a block form.

Obviously, numerous modifications and variations of the present invention are possible in light of the above teachings. It is therefore to be understood that within the scope of the appended claims, the invention may be practiced otherwise than as specifically described herein.

What is claimed is:

1. A method of processing a plurality of plate shaped materials into a circular shape which comprises:

stacking a plurality of plate shaped materials;

coating a bonding liquid on surfaces between adjacent plate shaped materials, wherein the bonding liquid contains a resin curable on irradiation by ultraviolet rays;

solidifying the resin upon irradiating to thereby provide the plurality of plate shaped materials in a block form;

cutting from the plate shaped materials stacked in the block form a block of a plurality of circular plates; and separating each of the plurality of plate shaped materials from one another;

wherein the coating of the bonding liquid on the surfaces between the adjacent plate shaped materials is conducted by immersing the plurality of plate shaped materials in the bonding liquid and allowing said bonding liquid to penetrate between said plurality of plate shaped materials to thereby provide the plurality of plate shaped materials in block form.

2. The method of processing a plurality of plate shaped materials according to claim 1, wherein the plate shaped materials are glass plates.

3. The method of processing a plurality of plate shaped materials according to claim 1, wherein the step of separating the plurality of plate shaped materials is conducted by dipping the plurality of plate shaped materials in boiling water.

4. The method of processing a plurality of plate shaped materials according to claim 1, wherein the step of separating the plurality of plate shaped materials is conducted by irradiation by ultraviolet rays.

5. A method of processing a plurality of plate shaped materials into a circular shape which comprises:

stacking a plurality of plate shaped materials;

coating a bonding liquid on surfaces between adjacent plate shaped materials, wherein the bonding liquid contains a resin curable on irradiation by ultraviolet rays;

solidifying the resin upon irradiating to thereby provide the plurality of plate shaped materials in a block form;

cutting from the plate shaped materials stacked in the block form a block of a plurality of circular plates; and separating each of the plurality of plate shaped materials from one another;

wherein the coating of the bonding liquid on the surfaces between the adjacent plate shaped materials is conducted by immersing at least part of a tray having the plurality of plate shaped materials therein in the bonding liquid, said tray having a plurality of openings therein, and allowing said bonding liquid to penetrate through said openings and between said plurality of plate shaped materials to thereby provide the plurality of plate shaped materials in block form.

6. The method of processing a plurality of plate shaped materials according to claim 5, wherein the plate shaped materials are glass plates.

7. The method of processing a plurality of plate shaped materials according to claim 5, wherein the step of separating the plurality of plate shaped materials is conducted by dipping the plurality of plate shaped materials in boiling water.

8. The method of processing a plurality of plate shaped materials according to claim 5, wherein the step of separating the plurality of plate shaped materials is conducted by irradiation by ultraviolet rays.

9. A method of perforating a plurality of plate shaped materials which comprises:

stacking a plurality of plate shaped materials;

coating a bonding liquid on surfaces between adjacent plate shaped materials, wherein the bonding liquid contains a resin curable on irradiation by ultraviolet rays; and solidifying the resin upon irradiating to thereby provide the plurality of plate shaped materials in a block form;

perforating the plate shaped materials stacked in the block form; and separating each of the plurality of plate shaped materials from one another;

wherein the coating of the bonding liquid on the surfaces between the adjacent plate shaped materials is conducted by immersing the plurality of plate shaped materials in the bonding liquid and allowing said bonding liquid to penetrate between said plurality of plate shaped materials to thereby provide the plurality of plate shaped materials in block form.

10. The method of perforating a plurality of plate shaped materials according to claim 9, wherein the plate shaped materials are glass plates.

11. The method of perforating a plurality of plate shaped materials according to claim 9, wherein the step of separating the plurality of plate shaped materials is conducted by dipping the plurality of plate shaped materials in boiling water.

12. The method of perforating a plurality of plate shaped materials according to claim 9, wherein the step of separating the plurality of plate shaped materials is conducted by irradiation by ultraviolet rays.

13. A method of perforating a plurality of plate shaped materials which comprises:

stacking a plurality of plate shaped materials;

coating a bonding liquid on surfaces between adjacent plate shaped materials, wherein the bonding liquid contains a resin curable on irradiation by ultraviolet rays; and solidifying the resin upon irradiating to thereby provide the plurality of plate shaped materials in a block form;

perforating the plate shaped materials stacked in the block form; and separating each of the plurality of plate shaped materials from one another;

wherein the coating of the bonding liquid on the surfaces between the adjacent plate shaped materials is conducted by immersing at least part of a tray having the plurality of plate shaped materials therein in the bonding liquid, said tray having a plurality of openings therein, and allowing said bonding liquid to penetrate through said openings and between said plurality of plate shaped materials to thereby provide the plurality of plate shaped materials in block form.

14. The method of processing a plurality of plate shaped materials according to claim 13, wherein the plate shaped materials are glass plates.

15. The method of processing a plurality of plate shaped materials according to claim 13, wherein the step of separating the plurality of plate shaped materials is conducted by dipping the plurality of plate shaped materials in boiling water.

16. The method of processing a plurality of plate shaped materials according to claim 13, wherein the step of separating the plurality of plate shaped materials is conducted by irradiation by ultraviolet rays.

17. A method of processing a plurality of plate shaped materials into a circular shape which comprises:

stacking a plurality of plate shaped materials;

coating a bonding liquid on surfaces between adjacent plate shaped materials, wherein the bonding liquid contains a resin curable on irradiation by ultraviolet rays;

solidifying the resin upon irradiating to thereby provide the plurality of plate shaped materials in a block form;

cutting off a plurality of doughnut shaped circular plate shaped materials from the plate shaped materials stacked in the block form; and separating each of doughnut shaped circular plate shaped materials from one another;

wherein the coating of the bonding liquid on the surfaces between the adjacent plate shaped materials is conducted by immersing the plurality of plate shaped materials in the bonding liquid and allowing said bonding liquid to penetrate between said plurality of plate shaped materials to thereby provide the plurality of plate shaped materials in block form.

18. The method of processing a plurality of plate shaped materials according to claim 17, wherein the plate shaped materials are glass plates.

19. The method of processing a plurality of plate shaped materials according to claim 17, wherein the step of separating the plurality of plate shaped materials is conducted by dipping the plurality of plate shaped materials in boiling water.

20. The method of processing a plurality of plate shaped materials according to claim 17, wherein the step of separating the plurality of plate shaped materials is conducted by irradiation by ultraviolet rays.

21. A method of processing a plurality of plate shaped materials into a circular shape which comprises:

stacking a plurality of plate shaped materials;

coating a bonding liquid on surfaces between adjacent plate shaped materials, wherein the bonding liquid contains a resin curable on irradiation by ultraviolet rays;

solidifying the resin upon irradiating to thereby provide the plurality of plate shaped materials in a block form;

cutting off a plurality of doughnut shaped circular plate shaped materials from the plate shaped materials stacked in the block form; and separating each of doughnut shaped circular plate shaped materials from one another;

wherein the coating of the bonding liquid on the surfaces between the adjacent plate shaped materials is conducted by immersing at least part of a tray having the plurality of plate shaped materials therein in the bonding liquid, said tray having a plurality of openings therein, and allowing said bonding liquid to penetrate through said openings and between said plurality of plate shaped materials to thereby provide the plurality of plate shaped materials in block form.

22. The method of processing a plurality of plate shaped materials according to claim 21, wherein the plate shaped materials are glass plates.

23. The method of processing a plurality of plate shaped materials according to claim 21, wherein the step of separating the plurality of plate shaped materials is conducted by dipping the plurality of plate shaped materials in boiling water.

24. The method of processing a plurality of plate shaped materials according to claim 21, wherein the step of separating the plurality of plate shaped materials is conducted by irradiation by ultraviolet rays.

\* \* \* \* \*